United States Patent [19]
Miyazaki et al.

[11] Patent Number: 5,203,204
[45] Date of Patent: Apr. 20, 1993

[54] FLOW REGULATING APPARATUS AND FLOW MEASURING APPARATUS FOR POROUS HYDROSTATIC BEARING

[75] Inventors: Takatomi Miyazaki, Tsuchiura; Satoshi Osaki, Ushiku, both of Japan

[73] Assignee: Canon Kabushiki Kaisha, Tokyo, Japan

[21] Appl. No.: 769,215

[22] Filed: Oct. 1, 1991

[30] Foreign Application Priority Data

| Oct. 4, 1990 | [JP] | Japan | 2-265083 |
| Oct. 4, 1990 | [JP] | Japan | 2-265084 |
| Oct. 4, 1990 | [JP] | Japan | 2-265085 |

[51] Int. Cl.$^5$ .................................. G01M 19/00
[52] U.S. Cl. ................................. 73/118.1; 73/38
[58] Field of Search ............ 422/261, 269, 278, 281, 422/284; 73/118.1, 38; 29/898.02

[56] References Cited

U.S. PATENT DOCUMENTS 4,875,366 10/1989 Kesler et al. ................. 73/118.1

Primary Examiner—Jerry W. Myracle
Attorney, Agent, or Firm—Fitzpatrick, Cella, Harper & Scinto

[57] ABSTRACT

A flow regulating apparatus for a porous hydrostatic bearing includes a measuring device for measuring a flow of injected gas through a bearing surface of the hydrostatic bearing to be regulated, a pattern member having a plurality of application pattern portions of different opening ratios on each of which a plurality of small holes are formed in a dispersive manner, and an application device for applying solvent on the bearing surface through the pattern member. A proper pattern portion is selected based on a flow measured by the measuring device, and the proper pattern portion and the application device are aligned with a portion of the bearing surface to which the solvent is to be applied. The solvent is then applied and this operation is repeated until the flow measured by the measuring device becomes a predetermined value.

12 Claims, 11 Drawing Sheets

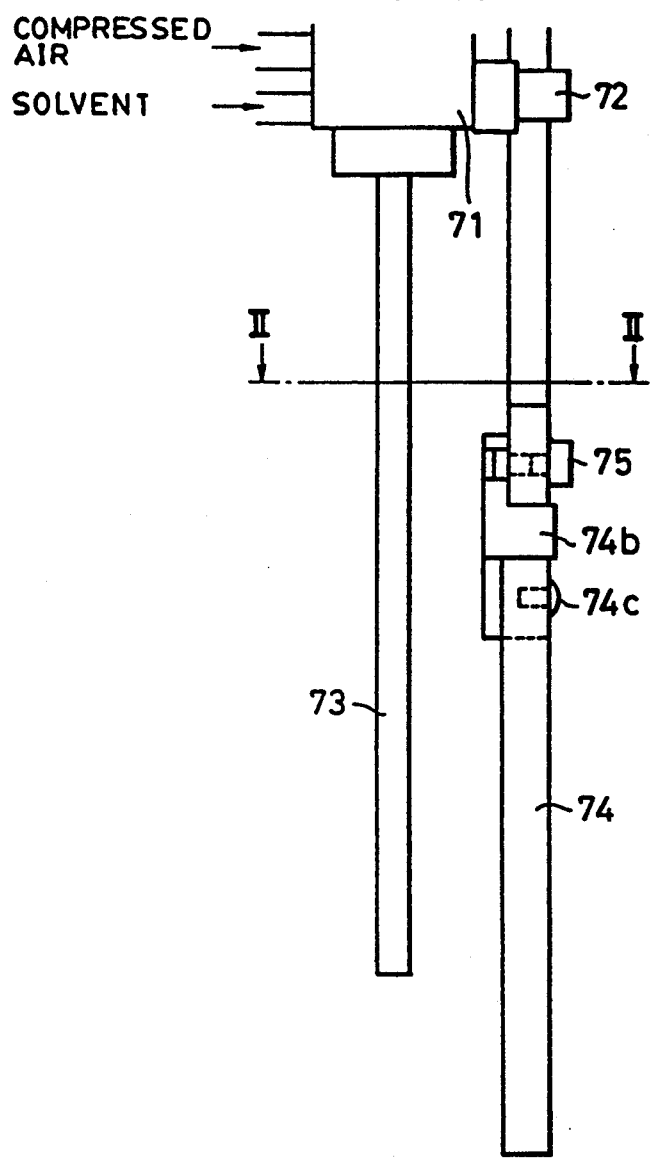
FIG. 11A
FIG. 11B
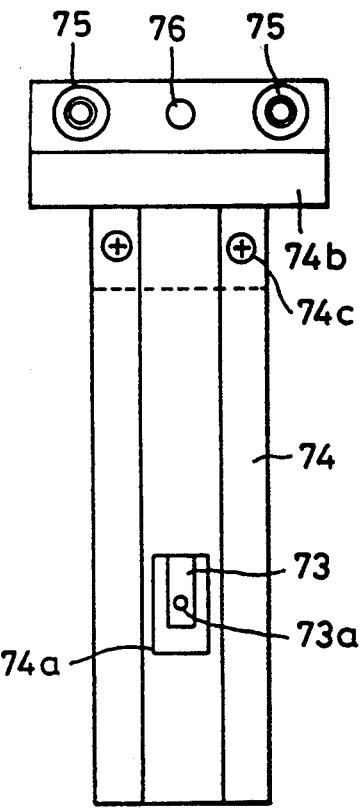
FIG. 11C
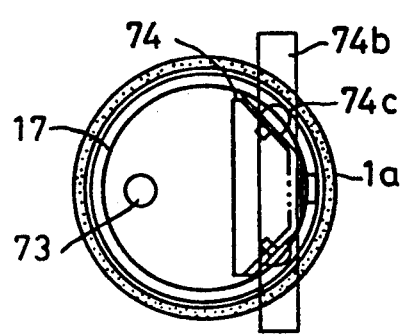
FIG. 11D
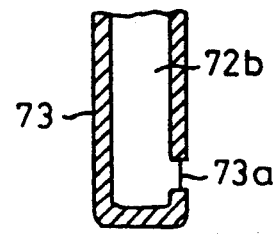

FLOW REGULATING APPARATUS AND FLOW MEASURING APPARATUS FOR POROUS HYDROSTATIC BEARING

BACKGROUND OF THE INVENTION

1. Field of the Invention

This invention relates to a flow regulating apparatus and method and a flow measuring apparatus and method for a porous hydrostatic bearing such as a cylindrical radial bearing.

2. Related Background Art

In order to obtain a predetermined bearing performance, such as rotational accuracy, high load capability and bearing rigidity in a porous hydrostatic bearing, it is required that, when gas at a predetermined pressure is supplied to a porous material, the flow of gas injected per unit area of a bearing surface or the flow of gas passing through the bearing surface be uniform over the entire bearing surface. As such a flow regulation method, the following process has been conventionally conducted. After holes in the porous material have been choked by imbuing the bearing surface with resin to obtain the flow less than a predetermined value, the resin is partially removed by solvent while measuring the flow of gas passing through the bearing surface. Thus, the regulation is performed to achieve a uniform flow. In more detail, the bearing surface is rubbed with a pin having solvent-imbued cotton to gradually recover the flow by dissolving the resin. Such operations are repeated until the desired flow is achieved.

In the prior art method, however, the regulation operation is relied on the operator's experience or intuition, so that the regulation process is conducted by trial and error. Thus, the number of operation steps becomes great and the cost increases. Further, the process entails a manual operation, so that standardization is difficult and variations in quality are great. In the regulation of the flow through a radial bearing surface, the regulating operation is conducted on the inner surface of a cylindrical, porous material, so that the operation condition is even more difficult.

FIG. 1 shows a prior art measuring method of the flow of passing gas. As shown in FIG. 1, the measuring is conducted by manually pushing a measuring pad 130 with a ring-shaped elastic material 2 at its tip against a radial bearing surface 1a of a porous hydrostatic bearing 1.

Reference numeral 1c is a supply path of compressed air and reference numeral 109 is a flow sensor.

In the prior art measuring method of FIG. 1, the elastic material is unstable, so that the measurement value also becomes unstable, and it takes much time to do the measurement. Moreover, since the elastic material 2 is manually pushed, the pushing force is not constant and the deformation of the elastic material varies each time the measurement of the flow is performed. Thus, the prior art method lacks consistency in obtaining the measured values.

Further, in the prior art regulating method, the solvent cannot be uniformly applied to a regulation area, and the application of solvent to a boundary portion between the regulation areas is difficult. It is also difficult to uniformly apply the solvent to the inner surface of a cylindrical porous material.

SUMMARY OF THE INVENTION

A first object of the present invention is to provide a flow regulation apparatus and a method for a porous hydrostatic bearing, in which the automization of a flow regulating operation can be effectively achieved.

A second object of the present invention is to provide a flow measuring apparatus and a method for a porous hydrostatic bearing such as a radial bearing in which the flow measurement of a bearing surface can be effected accurately and automatically.

A third object of the present invention is to provide a solvent applying apparatus for a porous hydrostatic bearing in which the application operation of solvent at a time of flow regulation can be performed effectively and automatically with little variation in quality.

According to one aspect of the flow regulating apparatus of the present invention, the flow regulating apparatus comprises:

a measuring device for measuring a flow of injected gas through a bearing surface of a hydrostatic bearing to be regulated in flow;

a pattern device having a plurality of application pattern portions of different opening ratios each of which having a plurality of small holes formed therethrough in a dispersed manner;

an application device for applying solvent onto the bearing surface through the pattern device;

a positioning device for moving the measuring device, the pattern device and the application device to align each of the devices relative to the bearing surface; and a controller for selecting a proper one of the plurality of pattern portions based on a flow measured by the measuring device and controlling the positioning device so as to align the proper pattern portion and the application device relative to a portion of the bearing surface to which the solvent is to be applied.

According to one aspect of the flow regulating method of the present invention, the flow regulating method for a porous hydrostatic bearing comprises the steps of:

measuring a flow of injected gas through a portion of a bearing surface of a hydrostatic bearing to be regulated;

selecting a proper one of the plurality of pattern portions having different opening ratios each of which having a plurality of small holes formed therethrough in a dispersed manner, based on a flow measured in the measuring step;

aligning the proper pattern portion, an application device for applying solvent on the bearing surface through the proper pattern portion, and a portion of the bearing surface to which the solvent is to be applied; and applying solvent on the portion of the bearing surface through the proper pattern portion by the application device.

According to another aspect of the flow measuring apparatus of the present invention, the flow measuring apparatus for a porous hydrostatic bearing comprises:

a detecting portion having a tip and an elastic material at its tip;

pushing means for pushing the elastic material against a bearing surface of the hydrostatic bearing at a constant pressure;

. a flow sensor; and gas guiding means for guiding gas flowing through the bearing surface and collected by the detection portion to the sensor.

According to another aspect of the flow measuring method of the present invention, the flow measuring method for a porous hydrostatic bearing comprises the steps of:

pushing an elastic material of a detecting portion connected to a flow sensor against a bearing surface at a constant pressure to collect a flow of gas; and detecting the flow of gas through the bearing surface and collected by the detection portion and measuring the flow of the gas with the flow sensor.

According to one aspect of the solvent applying apparatus of the present invention, the solvent applying apparatus for a porous hydrostatic bearing comprises:

a spray gun with a nozzle movable along the bearing surface of the hydrostatic bearing; and a mask having a window portion aligned with the nozzle and movable together with the spray gun.

These advantages and others will be more readily understood in connection with the following detailed description of the invention and the accompanying drawings.

BRIEF DESCRIPTION OF THE DRAWING

FIG. 11A is a side view of another embodiment of a spray and a mask.

FIG. 11B is a front view showing the spray and the mask of FIG. 11A.

FIG. 11C is a cross-sectional view taken along a line E—E' of FIG. 11A.

FIG. 11D is a cross-sectional view of the tip portion of the spray of FIG. 11A.

DESCRIPTION OF THE PREFERRED EMBODIMENT

Figure 1:
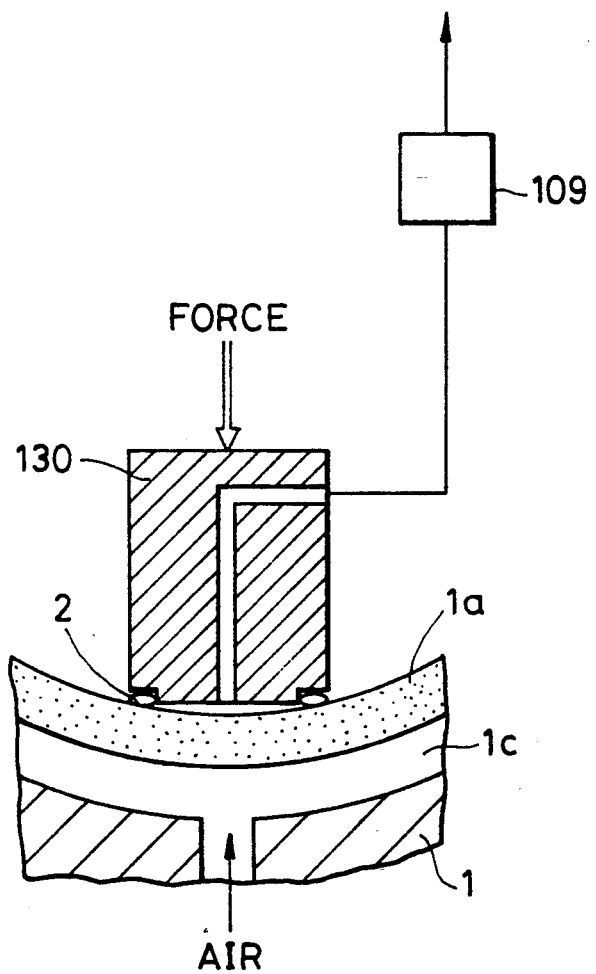
FIG. 1 is a view showing a prior art method for measuring the flow of a porous hydrostatic bearing.
Figure 2:
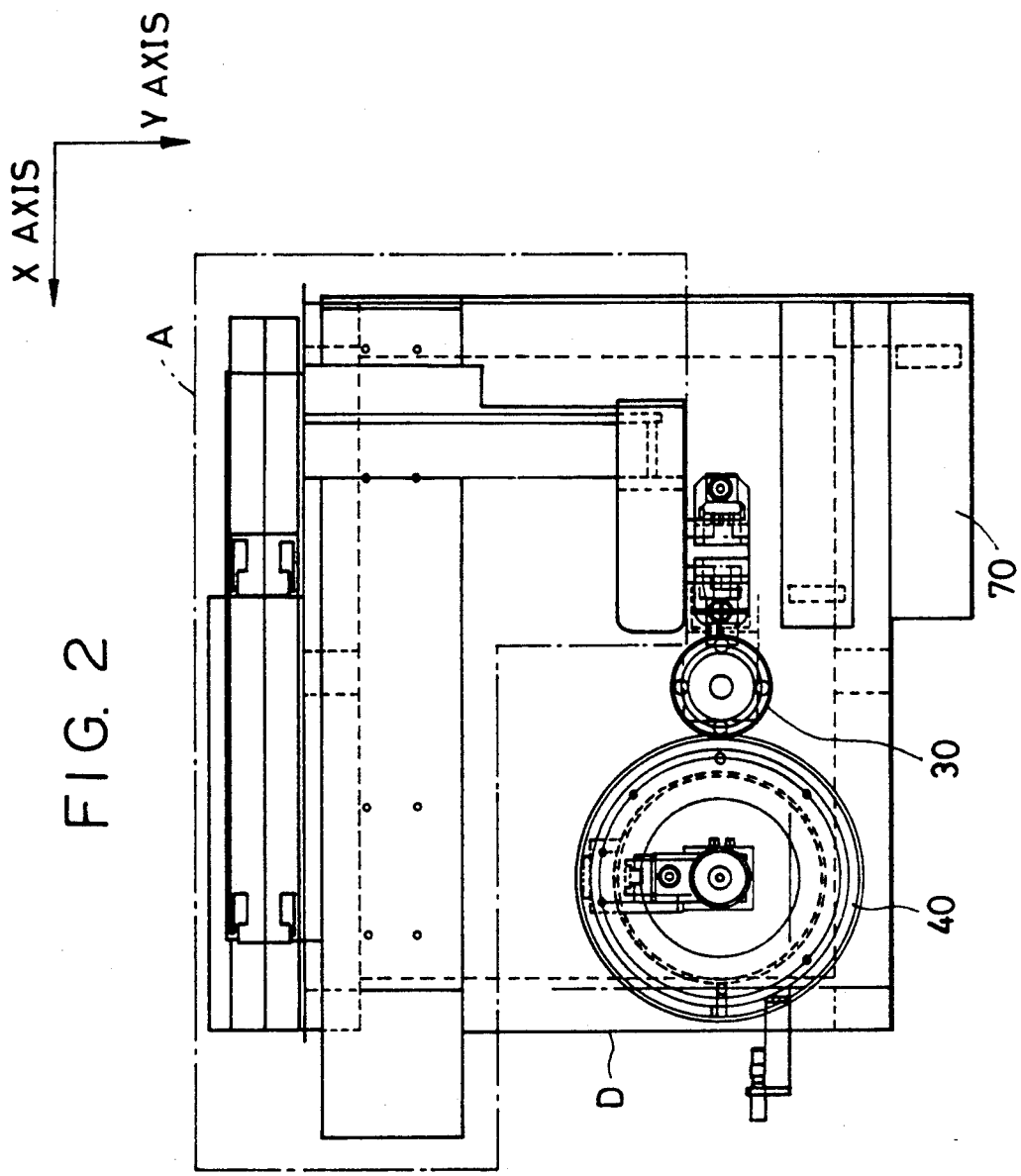
FIG. 2 is a plan view of an embodiment according to the present invention.
Figure 3:
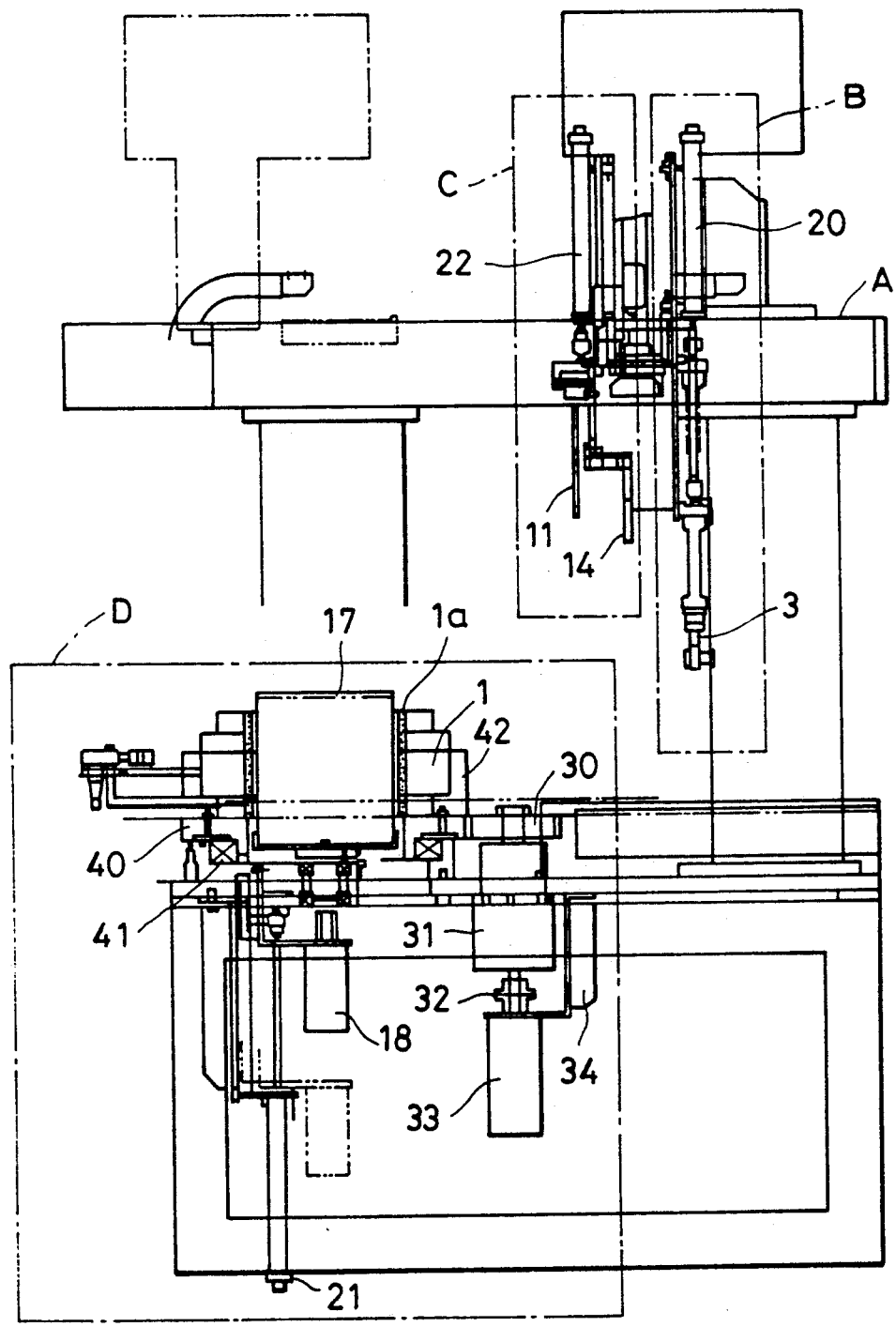
FIG. 3 is a side view of the embodiment of FIG. 2.

FIG. 2 shows a plan view of an entire structure of an embodiment of flow regulation apparatus, and FIG. 3 shows a side view thereof. In the embodiment, there are provided a numerically-controlled (NC) robot part (A part), a flow detecting part (B part), a flow regulating part (C part) and a work-indexing and pattern-indexing part (D part).

The NC robot part A functions to position the flow detecting part B and the flow regulating part C relative to a radial bearing surface $1a$ of a porous hydrostatic bearing 1 for which the flow should be regulated, according to a predetermined program.

Figure 4A:
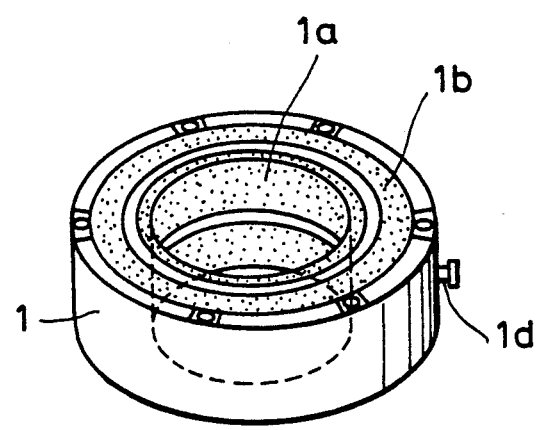
FIG. 4A is a perspective view of a porous hydrostatic bearing.
Figure 4B:
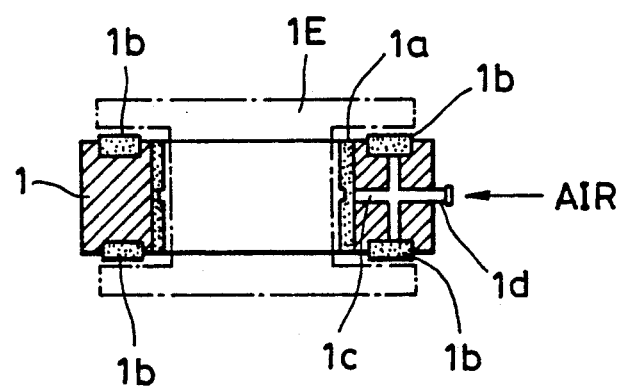
FIG. 4B is a cross-sectional view of the porous hydrostatic bearing of FIG. 4A.

FIG. 4A shows a perspective view of the porous hydrostatic bearing 1, and FIG. 4B shows its sectional view. A rotation-body member 1E (indicated by dotted lines) is hydrostatically supported by a structure including the radial bearing surface $1a$, a thrust bearing surface $1b$, a supply path $1c$ for compressed air and an air delivery port $1d$ to which a joint is mounted.

The flow detecting part B detects the flow of gas injected through the radial bearing surface $1a$. The flow detecting part B can be moved upward or downward by an air cylinder 20.

Figure 5A:
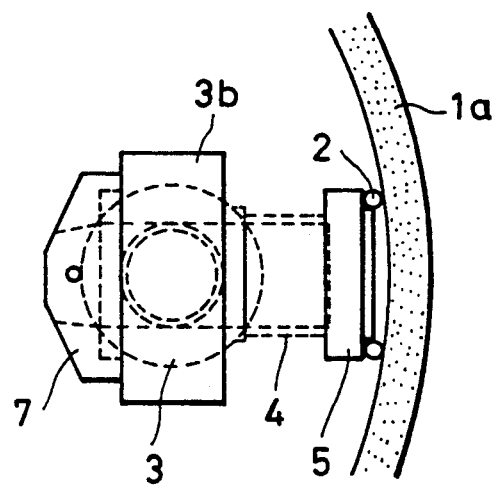
FIG. 5A is a partial plan view of a flow detection portion of the embodiment of FIG. 2.
Figure 5B:
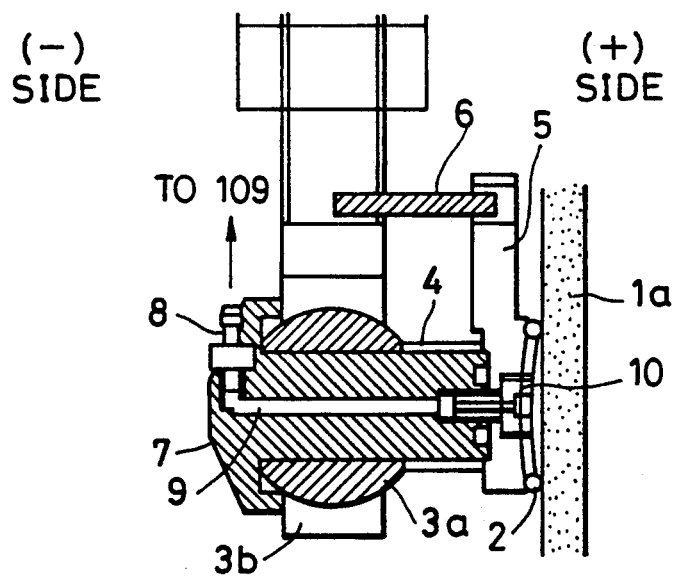
FIG. 5B is a partial side view of FIG. 5A.

FIG. 5A shows a plan view of the flow detecting part B, and FIG. 5B shows a side view thereof. The flow detecting portion fixed to a lower end of the air cylinder 20 is to be pushed against the radial bearing surface $1a$ by the NC robot A with the ring-shaped elastic material 2 provided therebetween. The flow to be detected flows through a portion of the bearing surface $1a$ surrounded by the ring-shaped elastic material 2. The elastic material 2 is fixed to a bracket 5. The bracket 5 is fixed to a piston 7 through a compression spring 4 by a bolt 10 having a small axial passage. The piston 7 is fitted into a spherical bearing 3. When the flow through the bearing surface $1a$ is to be detected, if the robot A is moved toward the bearing surface $1a$ to push the ring-shaped elastic material 2 against the bearing surface $1a$, the spherical bearing 3 is guided by the piston 7 and the ring-shaped elastic material 2 is pushed against the bearing surface $1a$ by the compression spring 4 at a constant pressure. The rotation prevention and guiding of the bracket 5 is performed by a member 6, and a joint 8 is connected to the flow sensor 109 through a line tube (not shown).

An O-ring made of silicon group material and having a soft rigidity is used for the ring-shaped elastic material 2. The spherical bearing 3 includes a movable bearing portion $3a$ and a fixed bearing portion $3b$. The portion of the bracket 5 to which the elastic material 2 is mounted by an adhesive has a curved section according to the curvature of the radial bearing surface $1a$. A plurality of different brackets 5 may be prepared according to the curvature of the radial bearing surfaces to be measured. The piston 7 has a gas path 9 for collecting gas cooperating with the small axial passage of the bolt 10.

In the above-discussed structure, the flow detection part is conveyed downwardly by the air cylinder 20 without contacting the inner surface of the radial bearing 1, and is stopped at a predetermined location. The NC robot A then moves in the X(+) direction to bring the ring-shaped elastic material 2 into contact with the radial bearing surface $1a$. The robot further moves slowly to push the elastic material 2 against the bearing surface $1a$. As the pushing force becomes greater than the spring force of the compression spring 4, the deflection of the spring 4 begins and the spherical bearing 3 moves to the (+) side with the piston 7 as a guide. The spherical bearing 3 is stopped at a predetermined position programmed into the NC robot A. The elastic material 2 is pushed against the bearing surface $1a$ at a constant pressure by the compression spring 4. The pin 6 guides the movement of the bracket 5, and further prevents rotation of the bracket 5. Since the piston 7 is supported by the spherical bearing 3, the ring-shaped elastic material 2 mounted to the bracket 5 is positively brought into contact with a portion to be measured, and the flow measurement can be performed accurately.

Figure 6C:
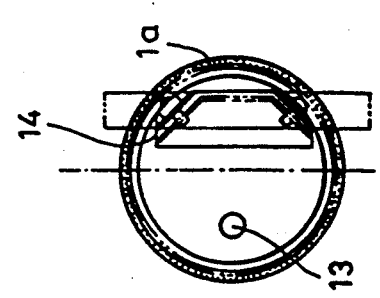
FIG. 6C is a cross-sectional view taken along a line E—E' of FIG. 6A.
Figure 6B:
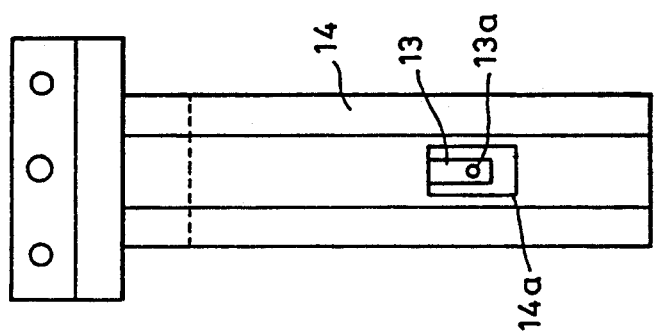
FIG. 6B is a front view showing the spray and the mask.
Figure 6A:
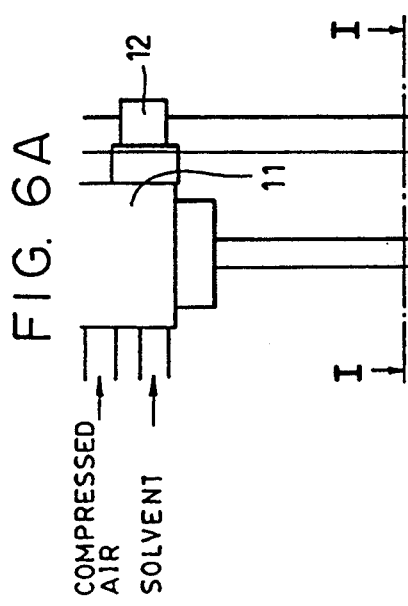
FIG. 6A is a side view showing a spray and a mask of the embodiment of FIG. 2.

The flow regulating part C is provided with a spray for applying solvent and a mask for limiting an area over which the flow is to be regulated. FIG. 6A shows a side view of the part C, FIG. 6B shows a front view thereof and FIG. 6C shows a cross-sectional view taken along an arrow E—E'. In FIGS. 6A-6C, reference numeral 11 is a spray body for applying a predetermined amount of misted solvent, reference numeral 12 is an adjusting knob for adjusting an amount of solvent to be applied, reference numeral 13 is a spray nozzle at a tip side portion of which a hole 13a for ejecting solvent is formed, reference numeral 14 is a mask for limiting a range over which the flow is to be regulated to prevent solvent from being applied to other areas, and reference 14a is a window through which the misted solvent is applied to the range to be regulated.

Figure 7:
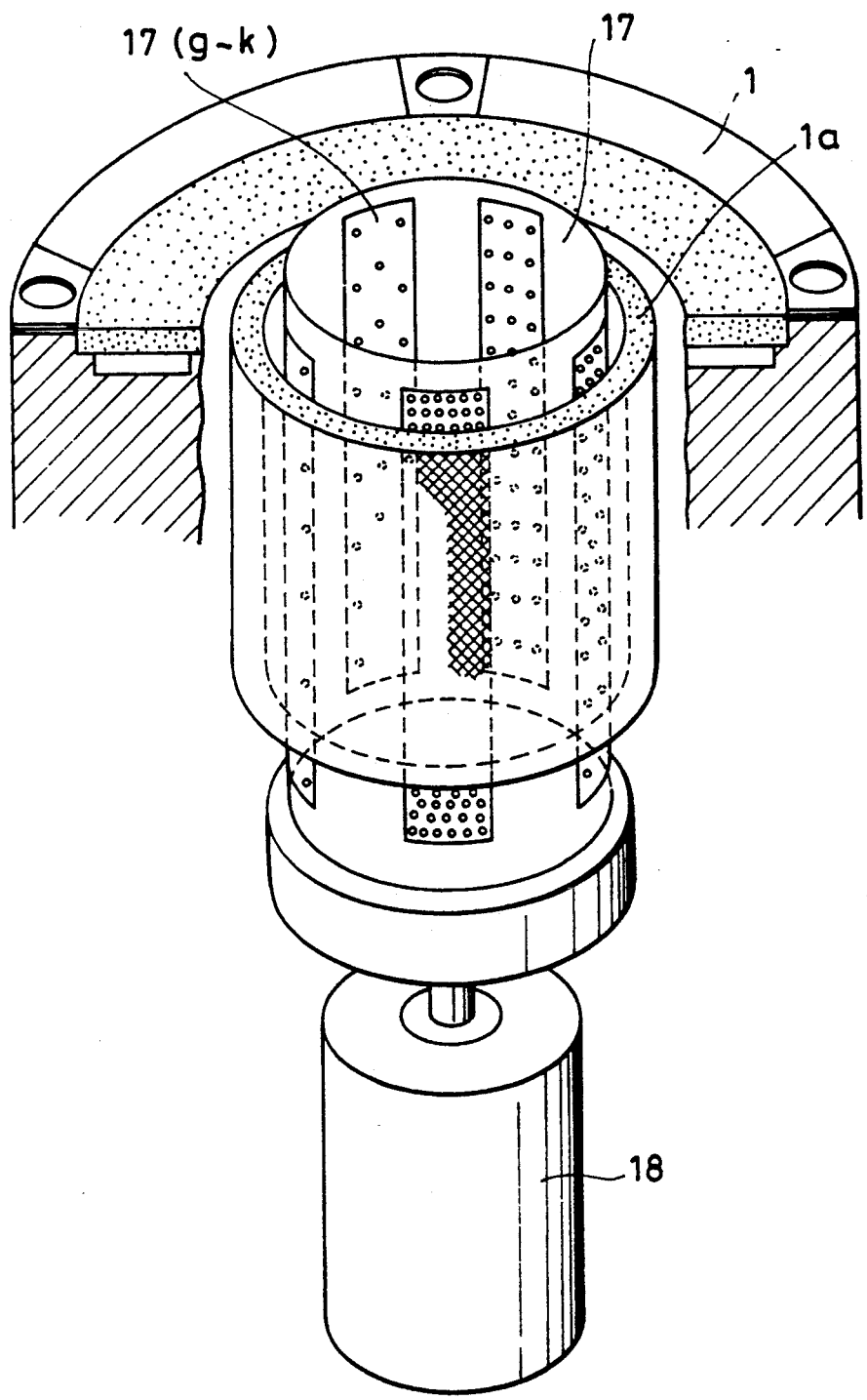
FIG. 7 is a perspective view of a pattern and a porous hydrostatic bearing of the embodiment of FIG. 2.

The indexing part D includes a pattern indexing portion for controlling the amount of solvent to be applied and a work indexing portion for dividing and positioning the workpiece with respect to a circumferential direction. As shown in FIG. 7, the workpiece 1 and a pattern 17 are formed into a cylindrical shape with gaps between the radial bearing 1a and the workpiece 1 and between the bearing 1a and pattern 17 each being about 1 mm. The workpiece 1 and the pattern 17 are disposed concentrically with the bearing surface 1a.

Figure 8A:
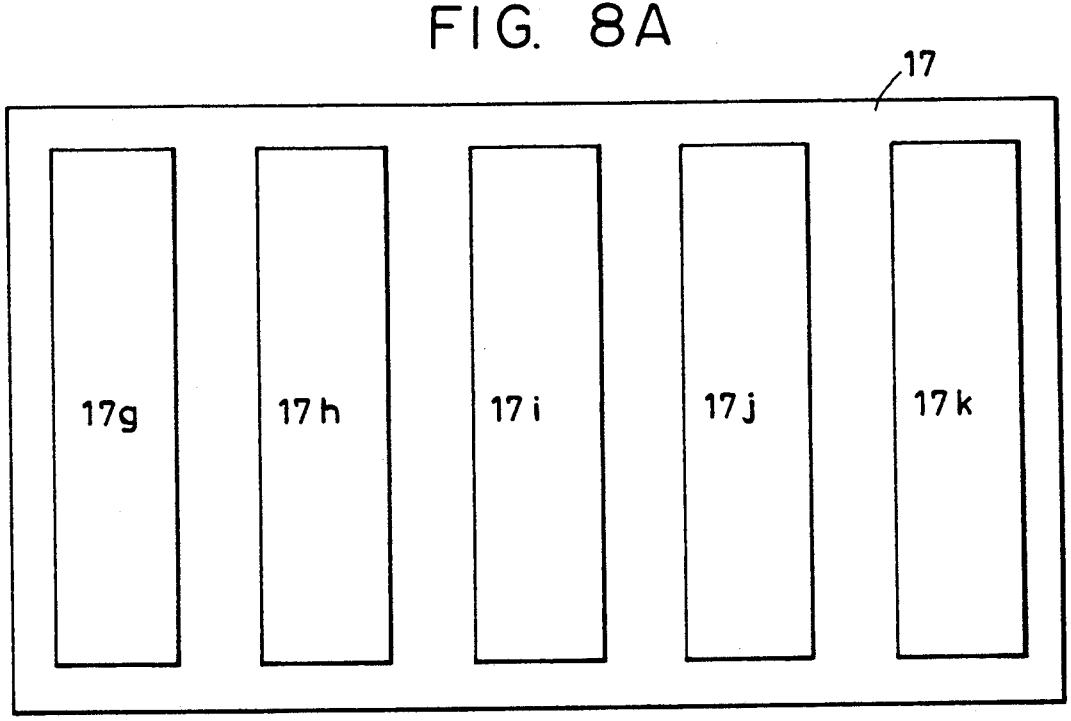
FIG. 8A is a development of the pattern of FIG. 7.
Figure 8B:
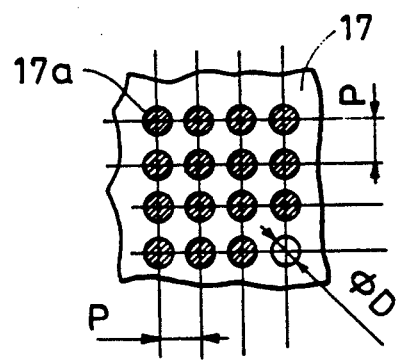
FIG. 8B is an enlarged view of small holes of the pattern of FIG. 7.

FIG. 8A shows a development of the pattern 17. Five opening portions 17g-17k are equally formed circumferentially on the pattern 17. Multiple small holes 17a are formed on each of the portions 17g-17k as shown in FIG. 8B. The diameter of the small holes 17a is about 0.5 mm. The ratio of the opening area of the holes with respect to the total area of the portion and a pitch P in each portion 17g-17k are as follows:

TABLE 1

| patterned portion | diameter (mm) | pitch (mm) | ratio of opening area (%) |
| --- | --- | --- | --- |
| 17g | 0.5 | 0.63 | 50 |
| 17h | 0.5 | 0.89 | 25 |
| 17i | 0.5 | 1.28 | 12 |
| 17j | 0.5 | 1.81 | 6 |
| 17k | 0.5 | 2.56 | 3 |

The pattern 17 is coupled to a stepping motor 18 with a reduction gear, and the pattern indexing of a needed ratio of opening area is performed according to the flow. Further, the pattern indexing part D is coupled to an air cylinder 21 as shown in FIG. 3, and the part D is retracted downward by the air cylinder 21 when the flow is to be detected.

As shown in FIG. 3, the work indexing portion includes a pinion gear 30 and a gear wheel 40. The pinion gear 30 is interlocked with a shaft of a reduction gear 31. The reduction gear 31 is coupled to a DC servo motor 33 through a coupling 32. The motor 33 is fixed to a motor fixing bracket 34. The gear wheel 40 is supported by a cross roller bearing 41. The work piece 1 is supported by a jig 42.

Figure 9:
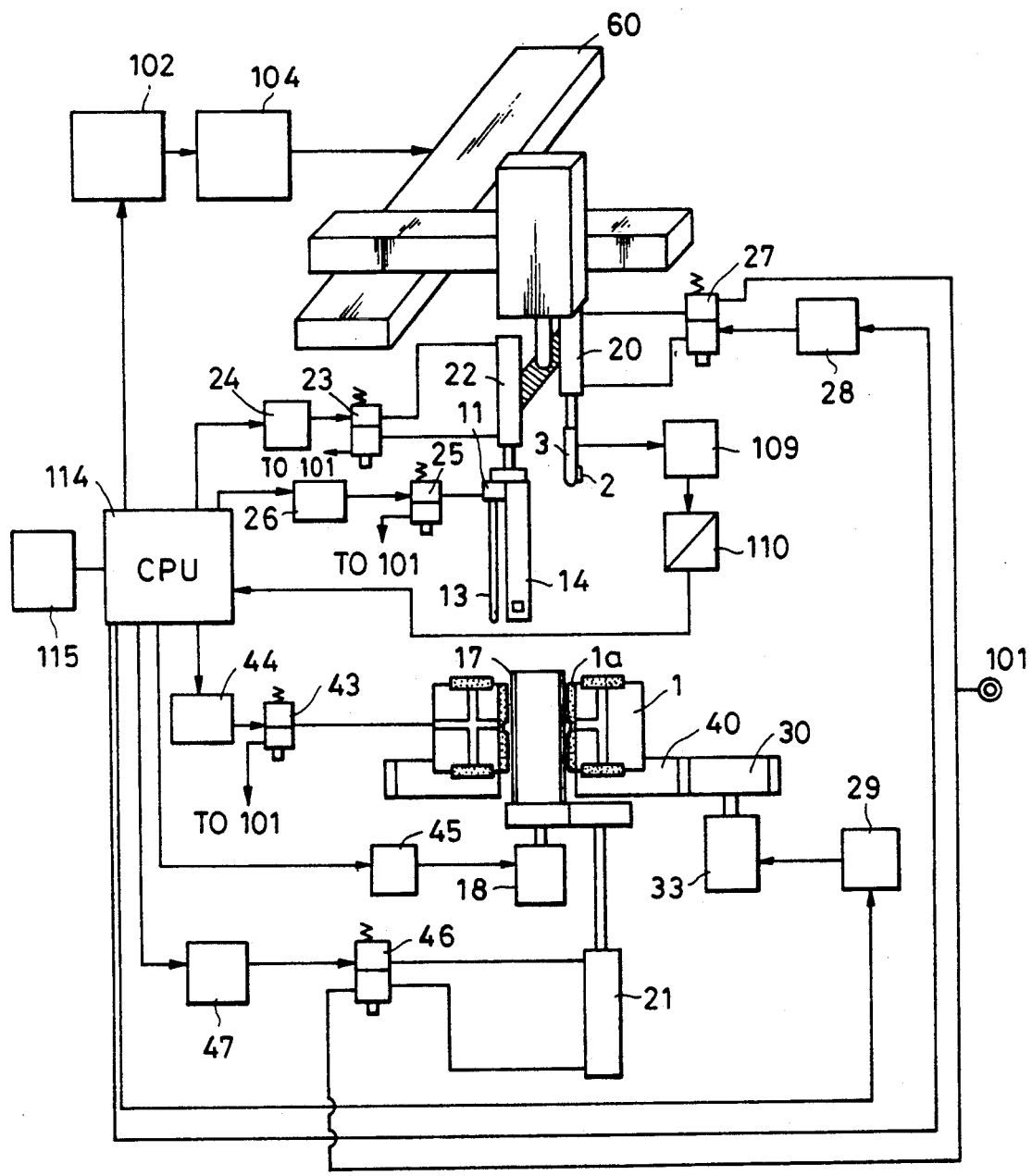
FIG. 9 is a block diagram of the embodiment of FIG. 2.

The entire structure of the embodiment will be further explained referring to FIG. 9 which is a block diagram of the entire structure, for further understanding.

In FIG. 9, an orthogonal two-axis NC robot 60 of robot part A positions the detection pad 2, mask 14 and spray gun 13 relative to a regulation point of the radial bearing surface 1a. Reference numeral 104 is a motor driver of the NC robot 60, reference numeral 102 is an NC controller connected to a CPU 114, reference numeral 115 is a memory connected to the CPU 114. A program for controlling the regulation of flow is stored in the memory 115, and the CPU 114 controls the flow regulation operation (explained in the following) of the apparatus based on the program. Reference numeral 23 is a solenoid valve for switching between ascent and descent of the air cylinder 22, reference numeral 24 is a driver for the solenoid valve 23 connected to the CPU 114, reference numeral 25 is a solenoid valve for intermittently supplying compressed air to the spray gun 11, reference numeral 26 is a driver for the solenoid valve 25 connected to the CPU 114.

The flow sensor 109 converts the detected flow to an electric signal. An A/D converter 110 connected to the CPU 114 converts an analog signal to a digital signal. The switching of the air cylinder 20 for ascending and descending the flow detecting portion is conducted by a solenoid valve 27. A driver 28 for the solenoid valve 27 is connected to the CPU 114. A motor driver 29 connected to the CPU 114 drives the servo motor 33.

The ON and OFF control of compressed air supplied to the porous hydrostatic bearing 1 is performed by a solenoid valve 43, and the solenoid valve 43 is driven by a driver 44 connected to the CPU 114.

The motor 18 for moving the pattern 17 is driven by a driver 45 connected to the CPU 114. A solenoid valve 46 conducts the switching between ascent and descent of the cylinder 21, and the solenoid value 46 is driven by a driver 47 connected to the CPU 114. A compressor 101 is a source of compressed air and is connected to each solenoid valve.

The operation of the embodiment is performed as follows.

The workpiece 1 is set on the gear wheel 40 using the jig 42 (see also FIG. 3). The solenoid valve 43 is switched on to supply compressed air to the workpiece 1. Next, the flow detecting part B is moved and stopped at a predetermined beginning location which has been programmed and at which the part B can be inserted into the inner portion of the workpiece 1, in response to an instruction from the CPU 114. Then, the solenoid valve 27 is switched to operate the cylinder 20 in order to descend the detecting part B into the radial bearing surface 1a (see also FIGS. 5A and 5B). The NC robot 60 moves in the X direction in response to an instruction from the CPU 114 to push the pad 2 against the radial bearing surface 1a. Thus, the flow is detected. At this time, the pattern 17 is in a retracted position removed from the radial bearing surface 1a. The detected flow is converted to an electric signal by the flow sensor 109, and then the electric signal is converted to a digital signal by the A/D converter 110 and sent to the CPU 114. Next, the solenoid valve 27 is switched to operate the cylinder 20 in order to ascend the detecting portion.

Then, a proper pattern is selected by a programmed operation method based on the input flow data, and an instruction is output to the driver 45 by the CPU 114 to operate the motor 18 for effecting the indexing of the pattern 17. The solenoid valve 46 is switched to operate the cylinder 21. The pattern 17 is ascended within the radial bearing surface 1a.

Next, an instruction is output to the NC robot 60, and the mask 14 takes the place of the position of the flow detecting portion and is moved to a position that has been preprogrammed. An instruction is output from the CPU 114 to switch the solenoid valve 23, and the cylinder 22 is operated to descend the mask 14 and the spray nozzle 13. Then, the solenoid valve 25 is intermittently operated so that compressed air is supplied to the spray gun 11. The solvent is sprayed to the radial bearing surface 1a through the mask 14 and the pattern 17 from the tip of the nozzle 13.

Figure 10:
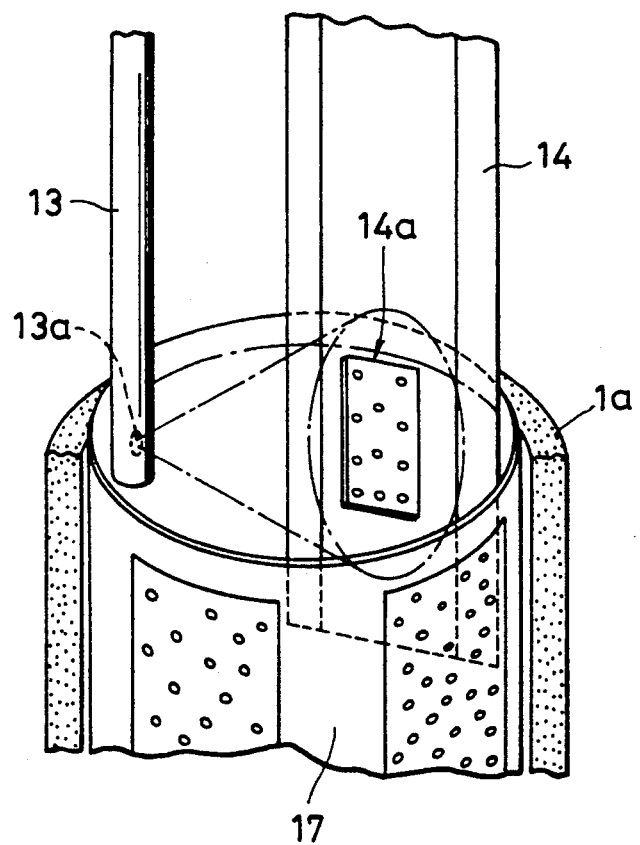
FIG. 10 is a view showing a manner of application of solvent in the embodiment of FIG. 2.

FIG. 10 shows a state of sprayed solvent. The spray nozzle 13 and the mask 14 are inserted within the pattern 17.

Both the solenoid valve 23 and the valve 46 are simultaneously switched to operate the cylinders 22 and 21, and the mask 14 and the spray nozzle 13 are ascended while the pattern indexing portion is descended. An instruction is output to the NC robot 60 to replace the position of the detecting portion with the position of the mask 14 and the spray nozzle 13. Then, the resulting flow after the spray of solvent is detected.

The above-mentioned operation is repeated to detect the flow in a predetermined range. Thus, the regulation at that location is completed, and the detecting pad 2 is moved to a retracted position. Then, the NC robot 60 is moved downward according to an instruction from the CPU 114, and the detecting portion is slid downward to be positioned at a next point with respect to upward and downward directions. The above-mentioned regulation is further conducted. Thus, when the regulation at divided locations with respect to upward and downward directions is completed, the detecting portion is retracted upwardly. An instruction from the CPU 114 is supplied to the motor driver 29 to operate the servo motor 33 for indexing a next point on the radial bearing surface 1a with respect to the circumferential direction. When those operations are sequentially repeated and the flow regulation at all divided points is completed, an initial state will be recovered. Thus, all the operations are achieved.

FIGS. 11A–11D show another embodiment of a solvent applying portion having a spray nozzle for applying solvent and a mask for limiting an area over which the flow is to be regulated. FIG. 11A shows a side view of this portion. FIG. 11B shows a front view thereof, FIG. 11C shows a cross-sectional view taken along an arrow F—F' and FIG. 11D shows a cross sectional view of the tip of the nozzle. In FIGS. 11A–11C, reference numeral 71 is a spray body for applying misted solvent uniformly, reference numeral 72 is an adjusting know for adjusting an amount of solvent to be applied, reference numeral 73 is a spray nozzle having a predetermined length with a hollow passage 72b and at a tip side portion of which a hole 73a for ejecting solvent in a direction normal to the longitudinal direction of the nozzle 73 is formed, reference numeral 74 is a mask for limiting a range over which the flow is to be regulated to prevent solvent from being applied to other unwanted areas, reference numeral 74a is a window through which the misted solvent is applied to the range to be regulated, and reference numeral 74b is a bracket to which the mask 74 is mounted. A plurality of masks are prepared according to the curvature of the radial bearing 1a, and similarly a plurality of brackets are prepared according to the size of the radial bearing 1a so that the distance between the nozzle 73 and the mask 74 is a predetermined value. The mask 74 is fixed to the bracket 74b by a rivet 74c. According to the kind of radial bearing, the mask 74 and the bracket 74b are exchanged with another. Further, reference numeral 75 are bolts for fixing the bracket 74b and reference numeral 76 is a pin for positioning the mask 74. The hole 73a is positioned at a center position of the window 74a by the positioning pin 76.

The operation of this embodiment is as follows.

After the NC robot 60 is positioned at a preprogrammed location, the air cylinder 22 is driven to descend the solvent applying portion and position it at a predetermined location within the radial bearing surface 1a without touching the radial bearing surface.

Next, the solenoid valve 25 for supplying compressed air to the spray body 71 is operated during a given period by a preset timer, and the solvent is sprayed through the hole 73a. The sprayed solvent passes the window 74a of the mask 74, and reaches the radial bearing surface 1a. At this time, the solvent stopped by a mask surface other than the window 74a will vaporize after impinging the mask 74.

As has been explained in the foregoing, according to the present invention, the regulation to flow in a porous hydrostatic bearing can be an automatic continuous operation. Therefore, the number of operations can be reduced, and the operation cost can be reduced. Further, a uniform quality can be obtained. Moreover, since the change of a flow regulation surface can be automatically performed in a large size bearing, the operation efficiency can be increased and the safe working can be realized.

Further, the measurement of flow in a porous hydrostatic bearing can be performed accurately and without fail, and the application of solvent to a porous bearing surface can be conducted uniformly and automatically.

While there have been shown and described what are considered preferred embodiments of the present invention, it will be apparent to those skilled in the art that various changes and modifications may be made therein without departing from the invention as defined by the following claims.

What is claimed is:

1. A flow regulating apparatus for a porous hydrostatic bearing, said apparatus comprising:
   measuring means for measuring a flow of injected gas through a bearing surface of the hydrostatic bearing to be regulated;
   pattern means having a plurality of application pattern portions of different opening ratios, each application pattern portion having a plurality of small holes formed therethrough in a dispersed manner;
   application means for applying solvent onto the bearing surface through said pattern means;
   positioning means for moving said measuring means, said pattern means and said application means to align each of them relative to the bearing surface; and
   control means for selecting a proper pattern portion of said plurality of pattern portions based on a flow measured by said measuring means and controlling said positioning means so as to align said proper pattern portion and said application means relative to a portion of the bearing surface to which the solvent is to be applied.

2. A flow regulating apparatus according to claim 1, wherein said pattern means comprises a cylindrical body on which said plurality of said pattern portions are formed, said plurality of pattern portions being positioned along a circumferential direction, of said cylindrical body, and said cylindrical body being rotatable and movable axially.

3. A flow regulating apparatus according to claim 1, wherein said measuring means comprises a detecting portion having a tip and an elastic material at the tip for collecting gas flowing through the bearing surface, means for pushing said elastic material against the bearing surface at a constant pressure, a flow sensor and means for guiding gas flowing through the bearing surface and collected by said detection portion to said sensor.

4. A flow regulating apparatus according to claim 1, wherein said application means comprises a spray gun with a nozzle movable along the bearing surface and a mask having a window portion correspondingly to said nozzle and movable together with said spray gun.

5. A flow regulating method for a porous hydrostatic bearing, said method comprising the steps of:
measuring a flow of injected gas through a portion of a bearing surface of a hydrostatic bearing to be regulated;
selecting a proper pattern portion from a plurality of pattern portions having different opening ratios, each pattern portion having a plurality of small holes formed therethrough in a dispersed manner, the proper pattern portion being selected based on a flow measured in said measuring step;
aligning the proper pattern portion, an application means for applying solvent on the bearing surface through the proper pattern portion, and a portion of the bearing surface to which the solvent is to be applied; and
applying solvent on the portion of the bearing surface through the proper pattern portion by the application means.

6. A flow measuring apparatus for a porous hydrostatic bearing comprising:
a detecting portion having a tip and an elastic material at the tip;
pushing means for pushing said elastic material against a bearing surface of the hydrostatic bearing at a constant pressure;
a flow sensor; and
gas guiding means for guiding gas flowing through the bearing surface and collected by said detection portion to said sensor.

7. A flow measuring apparatus according to claim 6, wherein said elastic material comprises a ring-shaped material.

8. A flow measuring apparatus according to claim 6, wherein said pushing means comprises a compression spring and means for guiding said detecting portion.

9. A flow measuring apparatus according to claim 6, wherein said detecting portion comprises a piston and a spherical bearing into which said piston is fitted, said piston including a portion of said gas guiding means.

10. A flow measuring method for a porous hydrostatic bearing, said method comprising the steps of:
pushing an elastic material of a detecting portion connected to a flow sensor against a bearing surface at a constant pressure to collect a flow of gas; and
detecting the flow of gas through the bearing surface and collected by the detection portion and measuring the flow of the gas with the flow sensor.

11. A flow measuring method according to claim 10, wherein the hydrostatic bearing is set on an indexing means for indexing a portion of the bearing to be measured, the indexing means having an axis and said bearing being movable around the axis, and the detecting portion is connected to a positioning means movable along the axis of the indexing means and in a direction perpendicular to the axis.

12. A flow measuring method according to claim 10, wherein the hydrostatic bearing has a cylindrical shape.

* * * * *

UNITED STATES PATENT AND TRADEMARK OFFICE
CERTIFICATE OF CORRECTION

PATENT NO. : 5,203,204
DATED : April 20, 1993
INVENTOR(S) : Miyazaki, et al.

It is certified that error appears in the above-indentified patent and that said Letters Patent is hereby corrected as shown below:

COLUMN 6:

Line 18, "gun 11," should read --gun 13,--.

COLUMN 7:

Line 54, "know" should read --knob--.

COLUMN 8:

Line 25, "to" should read --of--.

Signed and Sealed this

Twenty-ninth Day of March, 1994

Attest:

BRUCE LEHMAN

Attesting Officer

Commissioner of Patents and Trademarks